United States Patent
Miyamoto et al.

[11] Patent Number: 5,835,796
[45] Date of Patent: Nov. 10, 1998

[54] CAMERA WITH VIBRATION REDUCING FUNCTION

[75] Inventors: Hidenori Miyamoto, Urayasu; Yoshio Imura, Kawasaki; Toshiyuki Nakamura, Tokyo; Keishi Urata, Kumamoto, all of Japan

[73] Assignee: Nikon Corporation, Tokyo, Japan

[21] Appl. No.: 715,473

[22] Filed: Sep. 18, 1996

[30] Foreign Application Priority Data

Sep. 18, 1995 [JP] Japan .................................. 7-263530
Sep. 18, 1995 [JP] Japan .................................. 7-263531

[51] Int. Cl.⁶ .................................................. G03B 5/00
[52] U.S. Cl. ................................................ 396/48; 396/52
[58] Field of Search ................................... 396/48, 52–55

[56] References Cited

U.S. PATENT DOCUMENTS

| | | | |
|---|---|---|---|
| 5,041,852 | 8/1991 | Misawa et al. | 354/76 |
| 5,420,661 | 5/1995 | Hamada et al. | 396/55 X |
| 5,565,940 | 10/1996 | Amanuma et al. | 396/55 |
| 5,589,904 | 12/1996 | Urata et al. | 396/55 |
| 5,623,704 | 4/1997 | Miyamoto et al. | 396/55 |

*Primary Examiner*—W. B. Perkey
*Attorney, Agent, or Firm*—Staas & Halsey

[57] ABSTRACT

A camera with vibration reducing function includes a vibration detecting device for detecting vibrations of a camera, a photography directing unit for directing the camera to perform photometric/distance measuring operations by a turn-ON process and stopping the photometric/distance measuring operations by a turn-OFF process, a mode setting unit for directing the camera to set a specified mode, and a control device for controlling the vibration detecting device in accordance with the directions given from the photography directing unit and the mode setting unit. The control device makes the vibration detecting device continue the vibration detecting operation for such a duration that the mode setting unit sets the specified mode and that the photography directing unit is operated in the ON-state.

7 Claims, 15 Drawing Sheets

CAMERA WITH VIBRATION REDUCING FUNCTION

BACKGROUND OF THE INVENTION

1. Field of the Invention

The present invention relates to a camera having a vibration reducing device and assuming a consecutive photographing mode.

2. Related Background Art

In a prior art vibration reducing camera, when detecting vibrations to control a vibration reduction, a vibration reference signal is detected for every photography, and the vibration reducing process is executed upon receiving a shutter release signal. Then, simultaneously with a completion of exposure, the vibration reducing process and the detection of vibrations are finished.

Therefore, when a consecutive photographing mode is selected in a conventional camera with vibration reducing function, a vibration reference signal level must be detected before and after each of the photographing operation, and the detection of vibrations is ended. Consequently, a photographic interval of the consecutive photography elongates, resulting in such a problem that the number of photographic frames within a fixed time can not increase.

Further, in the prior art vibration reducing camera, when detecting the vibrations to control the vibration reduction, the vibration reference signal level is detected for every photography.

Therefore, when the consecutive photographing mode is selected in the conventional camera with vibration reducing control function, the vibration reference signal level must be detected each time the photography is conducted, and a total time of a sampling time and a calculating time might be a large hindrance against an increment in the number of photographic frames per unit time.

SUMMARY OF THE INVENTION

It is an object of the present invention to provide a camera capable of increasing the number of photographic frames per unit time while accurately reducing vibrations even in a consecutive photographing mode.

To accomplish the above object, according to a first aspect of the present invention, a camera with a vibration reducing function comprises a vibration detecting device for detecting vibrations of the camera, a photography directing unit for directing the camera to perform photometric/distance measuring operations by a turn-ON process and stopping the photometric/distance measuring operations by a turn-OFF process, a mode setting unit for directing the camera to set a specified mode, and a control device for controlling the vibration detecting device in accordance with the directions given from the photography directing unit and the mode setting unit. The control device makes the vibration detecting device continue the vibration detecting operation for such a duration that the mode setting unit sets the specified mode and that the photography directing unit is operated in the ON-state.

According to the first aspect of the present invention, the vibration detecting operation continues in the specified mode (consecutive photographing mode), and hence a necessity for a time for calculating the vibration reference signal for every photography is eliminated even in the consecutive photographing mode. Then, the number of photographic frames within a predetermined time can be increased.

According to a second aspect of the present invention, a camera with vibration reducing function, comprises a vibration detecting device for detecting vibrations of a camera, a photography directing unit for directing the camera to perform photometric/distance measuring operations by a turn-ON process and stopping the photometric/distance measuring operations by a turn-OFF process, a mode setting unit for directing the camera to set a specified mode, and a control device for controlling the vibration detecting device in accordance with the directions given from the photography directing unit and the mode setting unit. The control device calculates a vibration reference signal each time the photography is conducted for such a duration that the mode setting unit sets the specified mode and that the photography directing unit is operated in the ON-state.

According to the second aspect of the present invention, the data sampling for calculating the vibration reference signal during the consecutive photography is executed when performing a focus lens returning process and a film winding-up process after an exposure has been done. It is therefore feasible to increase the number of photographic frames per second during the consecutive photography.

According to a third aspect of the present invention, a camera with vibration reducing function comprises a vibration reference value calculating unit for calculating a reference value of vibration of the camera, a vibration detecting device for detecting vibration based on the reference value, a consecutive photographing mode selecting unit for directing the camera to select a consecutive photographing mode or a non-consecutive photographing mode, and a control device for controlling the vibration detecting device in accordance with a direction given from the consecutive photographing mode selecting unit. The control device, when the consecutive photographing mode is selected, operates the vibration reference value calculating unit up to a specified number of photographic frames in a series of photographing operations but inhibits the operation after the specified number of photographic frames.

According to the third aspect of the present invention, the vibration reference value calculating unit is operated up to the specified number of photographic frames in the series of photographic processes in the consecutive photographing mode, while the operation after the specified number of photographic frames is inhibited. Hence, it is feasible to accurately reduce the vibrations even in the consecutive photographing mode and restrain an electric current from being consumed as much as possible.

The above and other objects, features and advantages of the present invention will be explained hereafter and may be better understood by reference to the drawings and the descriptive matter which follows.

DETAILED DESCRIPTION OF THE PREFERRED EMBODIMENTS

Figure 1:
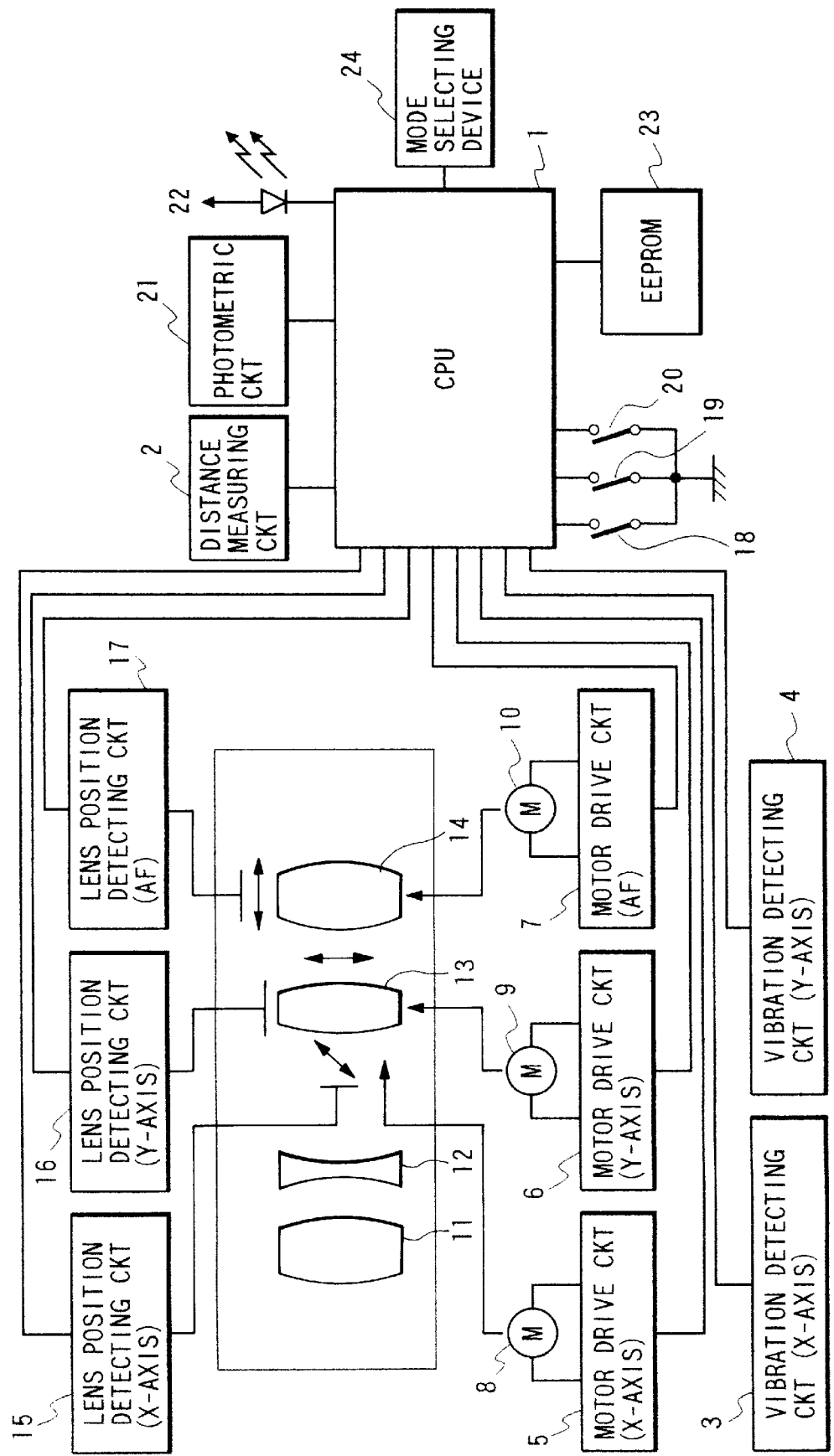
FIG. 1 is a block diagram illustrating one embodiment of a construction of a camera with vibration reducing function according to the present invention.

FIG. 1 is a block diagram illustrating one embodiment of a camera incorporating a vibration reducing function according to the present invention.

Referring to FIG. 1, a photographing lens unit is constructed of four pieces of lens elements 11, 12, 13, and 14. The vibration reducing lens 13 among these lens elements is a lens, for reducing vibrations, movable in an X-axis direction (in a longitudinal direction of the camera) and in a Y-axis direction (in a lateral direction of the camera) in order to reduce the vibrations. A CPU 1 is a one-chip microcomputerbased controller for controlling an entire sequence of the camera. It is assumed that the CPU 1 incorporates a counter function, a timer function for measuring a time, and an A/D converting function.

A distance measuring circuit 2 is a circuit for measuring a distance to an object. A photometric circuit 21 is a circuit for performing a photometric process about a peripheral area of field. A vibration indicator 22 indicates a detected state of the vibrations. A main switch 18 is a switch for starting an operation of the camera. The main switch 18 is a momentary switch constructed so that a power supply of the camera is switched ON upon inputting a main switch signal with a depression of the switch in an OFF-state of the camera, but is switched OFF upon inputting the main switch signal with the depression of the switch in an ON-state of the camera. A half-stroke depression switch 19 is a switch for starting a preparation for the photography with a half-stroke depression of a shutter release button. A release switch 20 is a switch turned ON by depressing the shutter release button at a full stroke. An EEPROM 23 is an electrically erasable programmable read-only memory.

A vibration detecting circuit (angular speed detecting circuit) 3 is a circuit for detecting an angular speed of a vibration quantity of the camera in the X-axis direction (in the longitudinal direction of the camera) with the Y-axis being centered. A vibration detecting circuit 4 is a circuit for detecting a Y-axis directional angular speed with the X-axis being centered. A motor driving circuit 5 is a circuit for controlling a motor 8. The motor 8 moves the vibration reducing lens 13 in the X-axis direction. A motor drive circuit 6 is a circuit for controlling a motor 9. The motor 9 moves the vibration reducing lens 13 in the Y-axis direction. A motor drive circuit 7 is a circuit for controlling a motor 10 for moving a focus lens 14.

A lens position detecting circuit 15 is a circuit for detecting a position (a moving quantity) of the vibration reducing lens 13 in the X-axis direction. A lens position detecting circuit 16 is a circuit for detecting a position (a moving quantity) of the vibration reducing lens 13 in the Y-axis direction. The vibration detecting circuit 3 and the vibration detecting circuit 4 are the circuits for detecting the vibrations of the camera. Output values of the vibration detecting circuits 3 and 4 fluctuate corresponding to angular speeds produced by the vibrations of the camera. The CPU 1 detects the angular speeds of the vibrations by executing an A/D conversion of those outputs. The vibration detecting circuit 4 detects the Y-axis directional angular speed with the X-axis being centered.

A motor drive circuit 5 duty-drives the motor 8. A motor drive circuit 6 duty-drives the motor 9. The CPU 1 outputs drive-direction signals to the motor drive circuits 5 and 6, thus indicating drive-directions of the motors 8 and 9. Further, the CPU 1 outputs drive duty signals to the motor drive circuits 5 and 6, thus indicating drive speeds of the motors 8 and 9. The motor drive circuits 5 and 6 energize the motors 8 and 9 with arbitrary duties in designated directions in accordance with those signals, thereby controlling the vibration reducing lens 13 at an arbitrary speed.

The CPU 1 calculates distance measuring data obtained by the distance measuring circuit 2. Based on a result of this calculation, the CPU 1 gives an indication to the motor drive circuit 7. The motor drive circuit 7 energizes the motor 10 in the direction designated by the CPU 1, thereby controlling the focus lens 14 at an arbitrary speed. Rotations of the motor 8 are converted into rectilinear motions by a vibration reducing lens drive mechanical system (unillustrated), thereby moving the vibration reducing lens 13 in the X-axis direction. Rotations of the motor 9 are converted into rectilinear motions by a vibration reducing lens drive mechanical system (unillustrated), thereby moving the vibration reducing lens 13 in the Y-axis direction. Rotations of the motor 10 are converted into rectilinear motions by a vibration reducing lens drive mechanical system (unillustrated), thereby moving the focus lens 14 in the optical-axis direction.

The lens position detecting circuit 15 outputs pulses according to an X-axis directional moving quantity of the vibration reducing lens 13. The CPU 1 counts the number of pulses and thus reads X- and Y-axis directional positions and moving quantities. Further, the CPU 1 detects the moving quantities for a fixed time, thereby calculating X- and Y-axis directional moving speeds. The lens position detecting circuit 17 outputs pulses according to an optical-axis directional moving quantity of the focus lens 14. The CPU 1 counts the number of pulses and thus reads an optical-axis directional position and moving quantity.

The EEPROM 23 is the electrically erasable programmable read-only memory to which necessary items of data for the photographic process are previously written. When needed in terms of executing a predetermined sequence, the CPU 1 reads a predetermined item of data from the EEPROM 23. A mode selection device 24 is a device for a photographer to select a photographic mode, and a consecutive photographing mode and a self-mode can be selected through this device.

An embodiment of the control executed by the camera according to the present invention will be described with reference to flowcharts shown in FIGS. 2 to 15. The CPU 1 incorporates control programs for those flowcharts.

In accordance with this embodiment, a distance measurement execution time of the distance measuring circuit 2 is on the order of 0 to 300 ms. A photometry execution time of the photometric circuit 21 is 50 ms. A moving time of the focus lens 14 is 100 ms. A circuit stabilizing time of each of the vibration detecting circuits 3 and 4 is 300 ms. A shock avoidance time when released is 50 ms. An angular speed zero detection time is 900 ms, and a pre-stabilizing control time for stabilizing the vibration reducing operation is 20 ms.

Figure 2:
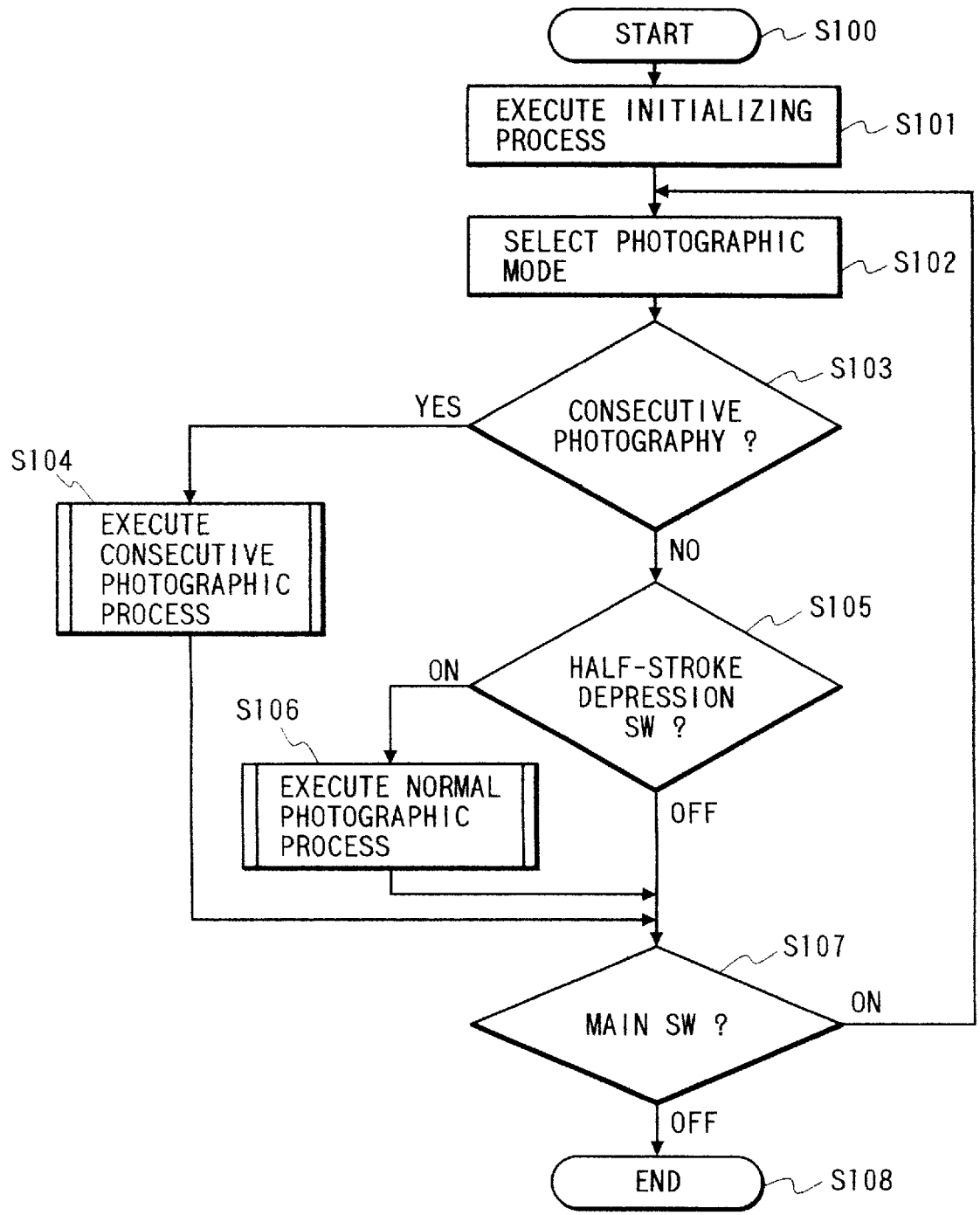
FIG. 2 is a flowchart showing a main flow of control executed by the camera with vibration reducing function according to the present invention.

FIG. 2 is a flowchart showing a main control flow. It is assumed that the power supply is switched ON, the main switch 18 is already turned ON, and the processing starts from step S100. At first, the CPU 1 is initialized inside in step S101. Next, the photographer selects a photographic mode through the mode selection device 24 in step S102. Subsequently, whether or not the consecutive photographing mode is selected is checked in step S103. When determining that the consecutive photographing mode is selected, the operation proceeds to step S104, wherein a consecutive photographic process is executed. After finishing the consecutive photographic process, the operation proceeds to step S107. If the main switch 18 is in the OFF-state in step S107, the operation proceeds to step S108, and the processing comes to an end.

When determining that the consecutive photographic mode is not selected in step S103, there must be a wait till the half-stroke depression switch 19 is turned ON in step S105, or till the main switch 18 is turned OFF in step S107. When determining that the main switch 18 is turned OFF in step S107, the operation proceeds to step S108, and the processing is ended. Thereafter, there must be a wait till the main switch 18 is turned ON once again. When the main switch 18 is turned ON once again, the processing resumes from step S100. When the half-stroke switch 19 is turned ON in step S105, the operation proceeds to step S106, wherein a normal photographic process is executed.

Figure 3:
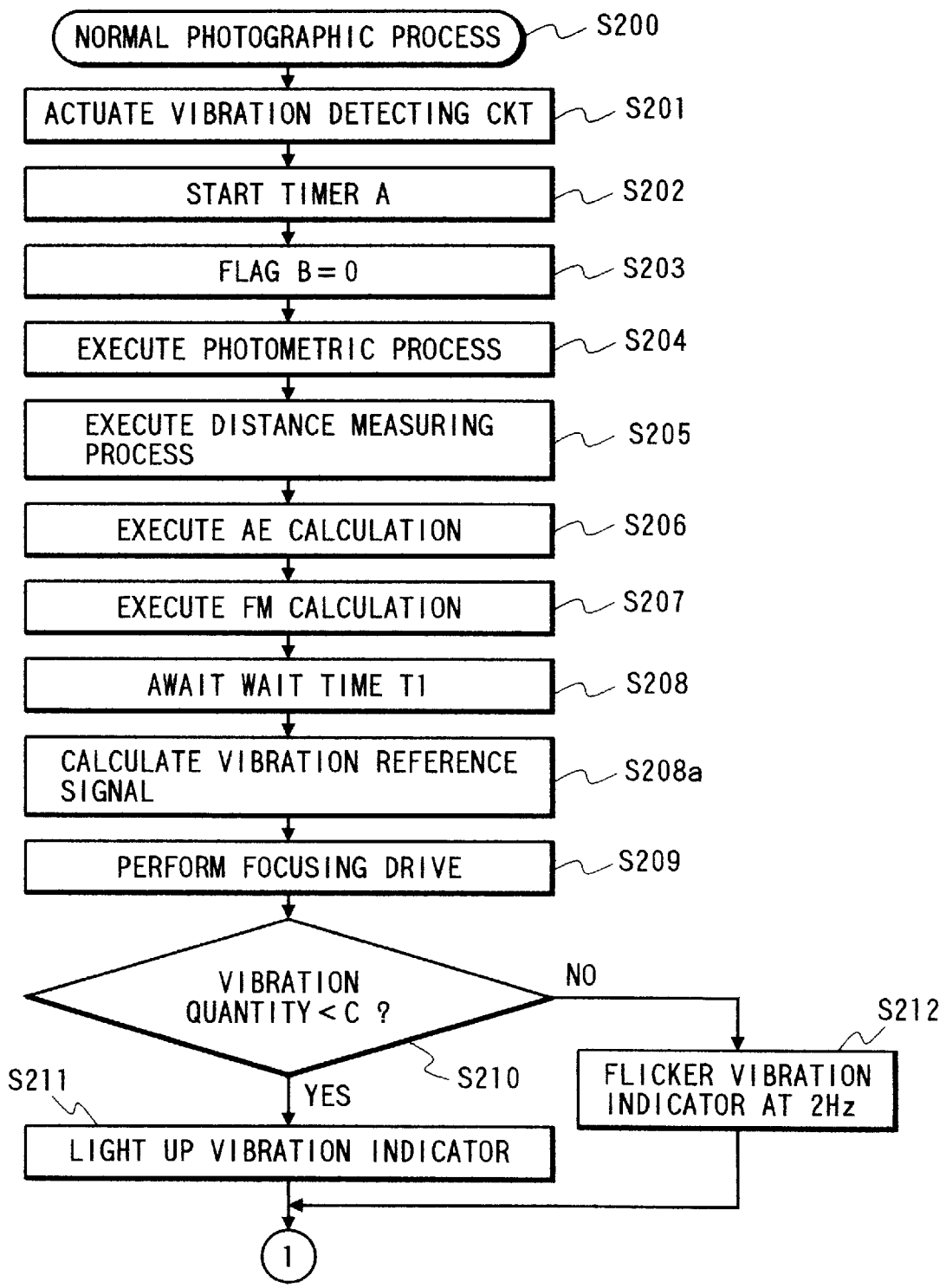
FIGS. 3 through 5 are flowcharts showing a normal photographic process applied to the camera with vibration reducing function in a first embodiment of the present invention.
Figure 4:
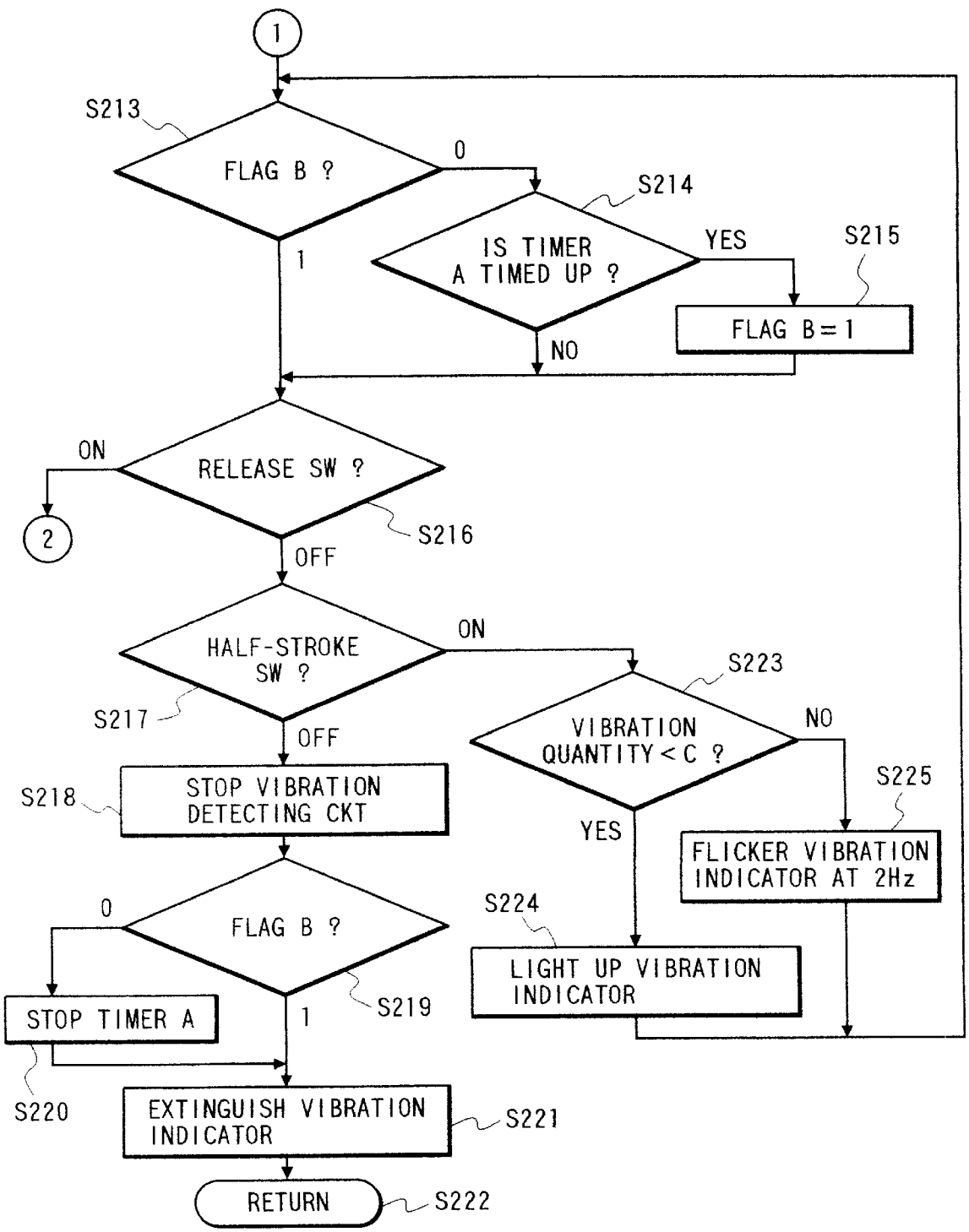
Figure 5:
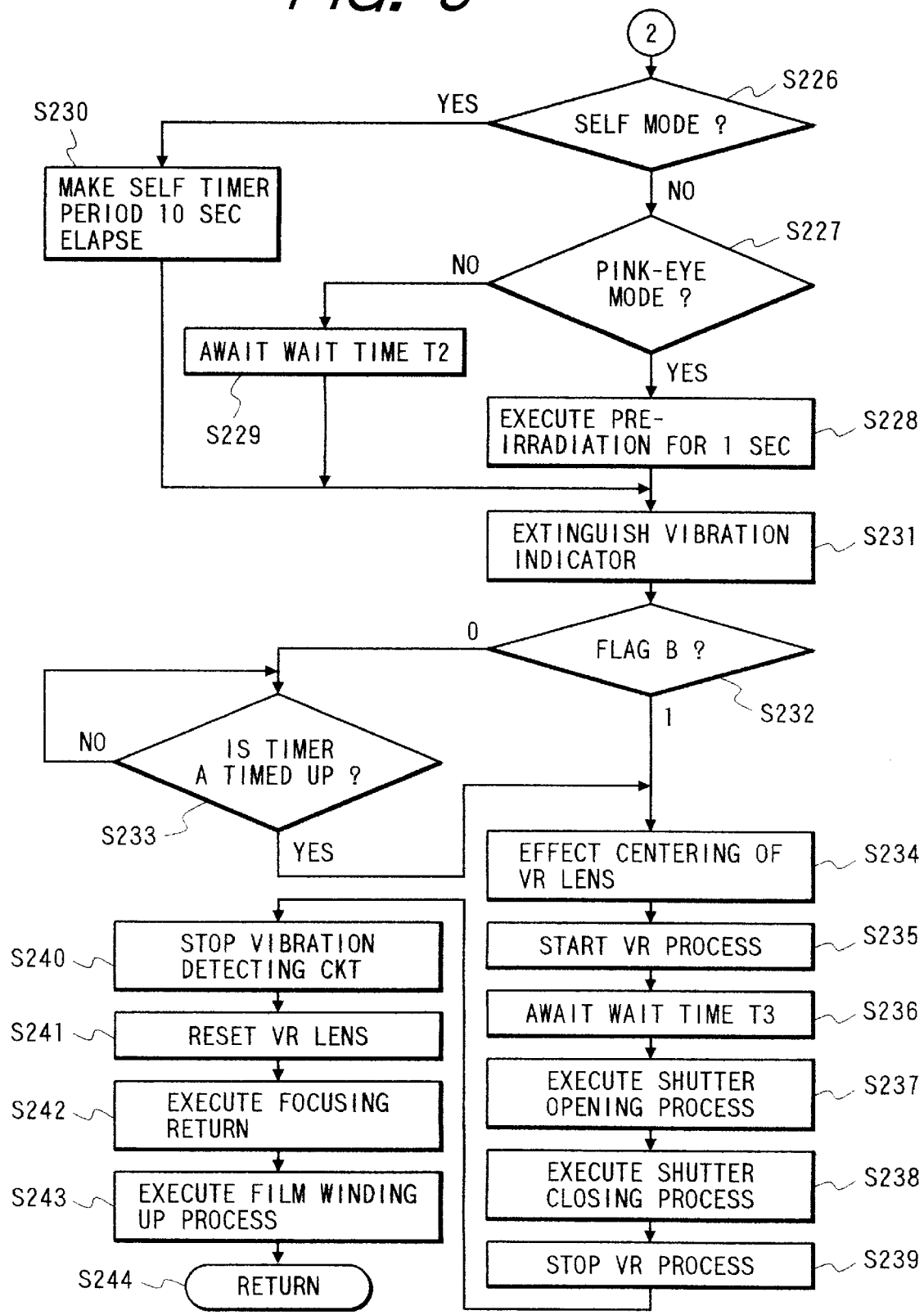

FIGS. 3 to 5 are flowcharts of assistance in explaining details of the normal photographic process (step S106 in FIG. 2) in the first embodiment.

When confirming that the half-stroke depression switch 19 is turned ON in step S105 (FIG. 2), the normal photographic process (step S106 in FIG. 2) is started from step S200 in FIG. 3. To begin with, the vibration detecting circuits 3 and 4 are actuated in step S201. In next step S202, a timer A (a timer for an angular speed zero detection time, which measures 900 ms in the first embodiment) is started, and a flag B is set to 0 in step S203. Next, a photometric process is executed in step S204, and a distance measuring process is then carried out in step S205.

In subsequent step S206, a result of the photometric process executed in step S204 is AE-calculated, and an FM-calculation is executed by making use of the result of the distance measuring process executed in step S205. In next step S208, a wait time T1 is waited. The wait time T1 is required for securing a circuit stabilizing time of each of the vibration detecting circuits 3 and 4. In the first embodiment, a time obtained by subtracting the distance measuring time of 0 to 300 ms and the photometric time of 50 ms from the circuit stabilizing time of 300 ms, is 0 to 250 ms. Hence, the wait time T1 is set to 250 ms. In step S208a, a vibration reference value is calculated. Generally, output signals of the vibration detecting circuits 3 and 4 contain a drift quantity, and therefore a vibration reference signal is calculated in step S208a to obtain a precise angular speed by removing that drift quantity. The vibration reference signal can be calculated by averaging the output signal of the vibration detecting circuit 3 or 4 within a time shorter than a period of the drift component contained in the output signal of the vibration detecting circuit 3 or 4.

In step S209, the focus lens 14 is moved to a predetermined position in accordance with the distance measurement value set in step S205. Checked in step S210 is whether or not the output from each of the vibration detecting circuits 3 and 4, i.e., the vibration quantity is smaller than a predetermined value C. When determining that the vibration quantity is smaller than the predetermined value C in step S210, an indication on the vibration indicator 22 is lit up in step S211, and the operation proceeds to step S213 in FIG. 4. When the indication on the vibration indicator 22 is lit up, this indicates that the detected vibration quantity falls within a vibration reducible range.

When determining that the vibration quantity is larger than the predetermined value in step S210, the vibration indicator 22 is flickered at 2 Hz, and the operation proceeds to step S213. The 2 Hz-flicker on the vibration indicator 22 implies an ambiguity as to whether the vibrations are reducible or irreducible because of the detected vibration quantity being large.

The flag B is confirmed in step S213 in FIG. 4, and, if the flag B set in step S203 is 0, the operation proceeds to step S214. When determining that the flag B is set to 1 in step S213, the operation proceeds directly to step S216.

When confirming a time-up (corresponding to an elapse of 900 ms as an angular speed zero detection time in the first embodiment) of the timer A in step S214, the flag B is set to 1 in step S215, and the operation proceeds to step S216. If the time-up of the timer A is not confirmed in step S214, the operation proceeds to step S216.

The ON-state of the release switch 20 is confirmed in step S216, and, when turned ON, the operation proceeds to step S226 in FIG. 5. When the release switch 20 is in the OFF-state in step S216, the ON-state of the half-stroke depression switch 19 is confirmed in the next step S217. When confirming the OFF-state of the half-stroke depression switch 19 in the next step S217, the vibration detecting circuits 3 and 4 are stopped in step S218. Thereafter, the flag B is confirmed in step S219. If the flag B is 1, the operation proceeds to step S221. In the case of B being 0, the timer A is stopped in step S220, and thereafter the operation proceeds to step S221. The indication on the vibration indicator 22 is extinguished in step S221, and thereafter the operation returns to the main flow in FIG. 2 from step S222. In this case, the photography is not conducted.

When confirming the ON-state of the half-stroke depression switch 19 in step S217, whether or not the output from each of the vibration detecting circuits 3 and 4, i.e., the vibration quantity is smaller than the predetermined value, is checked in next step S223. When determining that the vibration quantity is smaller than the predetermined value, the indication on the vibration indicator 22 is lit up in step S224, and the operation returns to step S213. When determining that the vibration quantity is larger than the predetermined value C in step S223, the vibration indicator 22 is flickered at 2 Hz in step S225, and the operation returns to step S213.

Whether the self mode is selected is checked in step S226 in FIG. 5. If the mode is the self mode (YES), the operation proceeds to step S231 after a self timer period (e.g., 10 seconds) has elapsed in step S230. When determining that the mode is not the self mode (NO) in step S226, whether a pink-eye mode is nor is checked in step S227. When determining that the mode is not the pink-eye mode in step S227, after awaiting till a wait time T2 (a shock avoiding time when released, i.e., 50 ms in the first embodiment) elapses in step S229, the operation proceeds to step S231. When determining that the mode is the pink-eye mode in step S227, pre-irradiation is effected for 1 second in step S228, and thereafter the operation proceeds to step S231.

Extinguished is the indication on the vibration indicator 22 which has been turned ON or OFF in steps S231, S211, S212, S224 or S225, and the operation proceeds to step S232. A state of the flag B is confirmed in step S232. When the flag B is 1, the operation proceeds to step S234. When determining that the flag B is 0 in step S232, there must be a wait in the next step S233 until the timer A started in step S202 expires and, after a given time has elapsed, the operation proceeds to step S234.

In step S234, the center of the vibration reducing lens (VR lens) 13 is shifted from an initial reset position to a central position of the optical axis. The vibration reduction process (VR process) is started in step S235, and a wait time T3 (a pre-stabilizing control time for stabilizing the control of the vibration reduction, which may be 20 ms in the first embodiment) is waited in step S236, and thereafter the operation proceeds to step S237. In step S237, the shutter starts opening.

The vibration reducing process continues from step S235 before the shutter starts opening up to step S239 immediately after the shutter has completely closed. In step S237, the shutter is opened for a predetermined second with an EV value according to an AE arithmetic value obtained in step S206. Thereafter, a shutter closing process is executed in step S238, and a vibration reducing process is stopped in step S239. Next, the vibration detecting circuits 3 and 4 stop in step S240. Next, the vibration reducing lens 13 is moved back to the initial position in step S241, and the focus lens 14 is moved to a predetermined reset position in step S242. Subsequently, a film is wound up in step S243, and the operation returns to the main flow in FIG. 2 from step S244.

Figure 6:
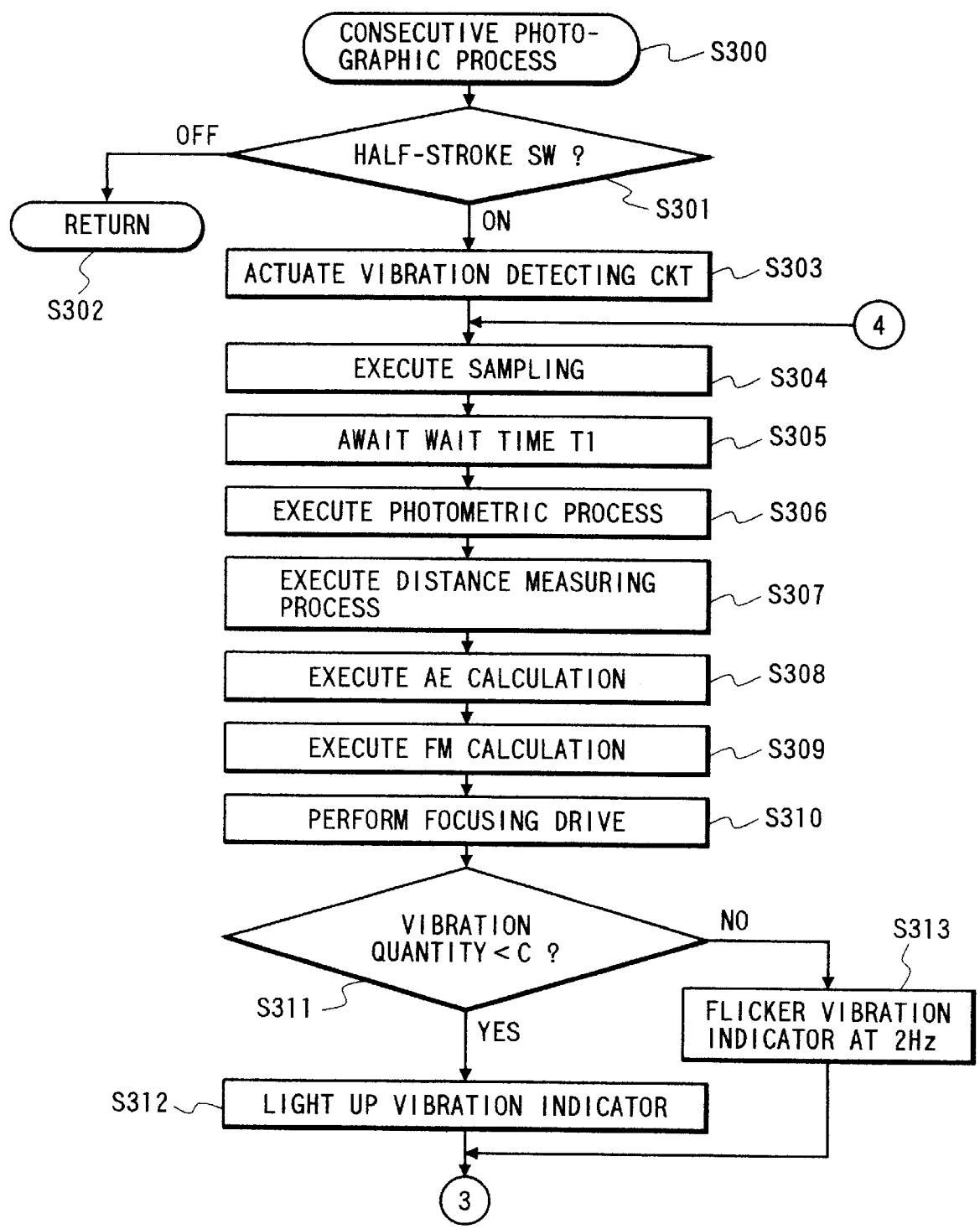
FIGS. 6 and 7 are flowcharts showing a consecutive photographic process applied to the camera with vibration reducing function in the first embodiment of the present invention.
Figure 7:
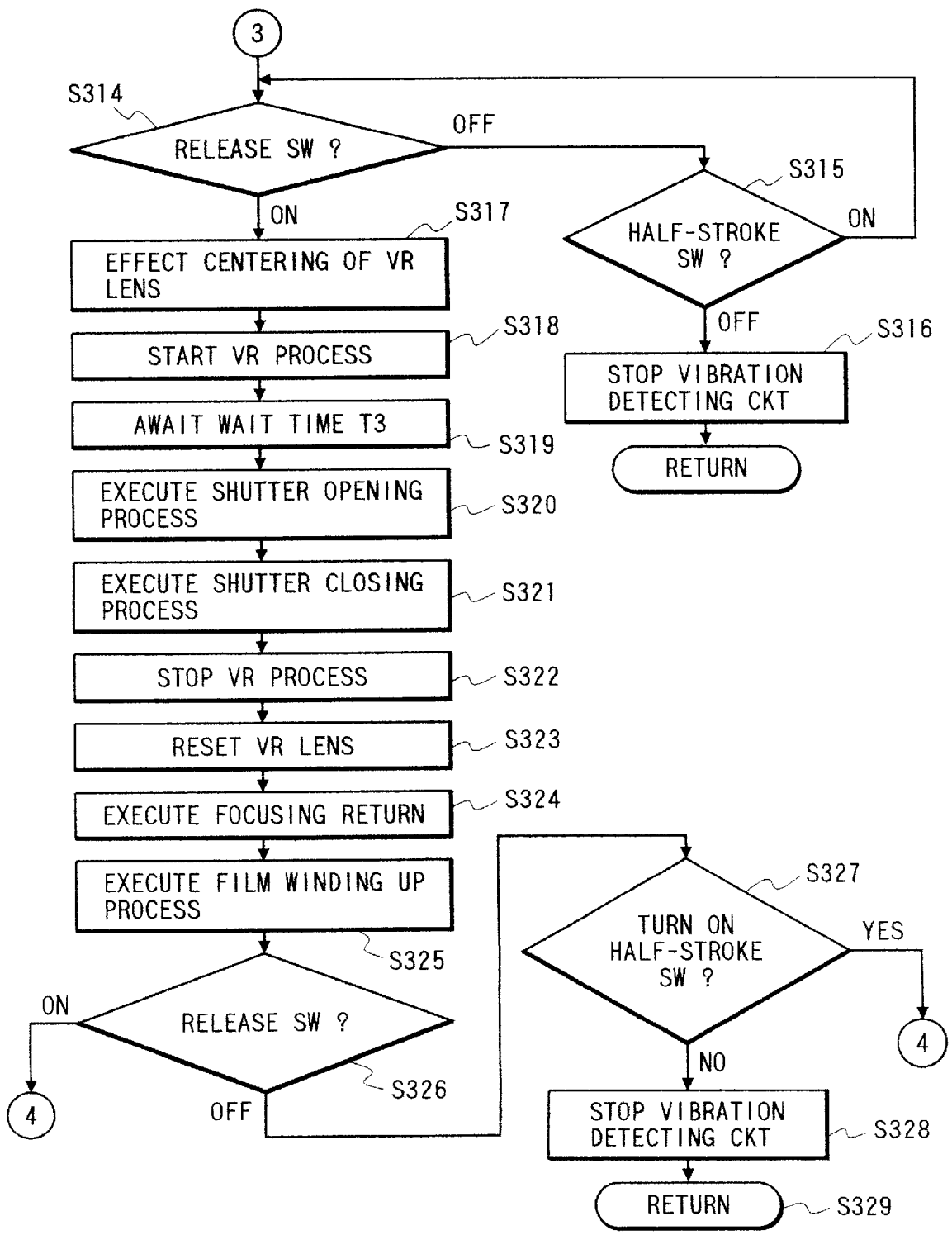

FIGS. 6 and 7 are flowcharts showing the consecutive photographing process (step S104 in FIG. 2) in the first embodiment. When determining that the consecutive photographing mode is selected in step S103 in the main flow shown in FIG. 2, the operation proceeds to this consecutive photographing process.

The half-stroke depression switch 19 is confirmed in step S301, and, when determining that the half-stroked depression switch 19 is in the OFF-state, the operation proceeds to step S302 and then returns to the main flow (FIG. 2).

When determining that the half-stroke switch 19 is in the ON state in step S301, the vibration detecting circuits 3 and 4 are actuated in step S303. In next step S304, an elapse of a sampling time (approximately 800 ms) for calculating the vibration reference value is waited in the next step S304. The wait time T1 in the next step S305 is needed for securing the circuit stabilizing time for each of the vibration detecting circuits 3 and 4. In the first embodiment, the value obtained by subtracting the distance measuring time of 0 to 300 ms and the photometric time of 50 ms from the vibration detecting circuit stabilizing time of 300 ms, is 0 to 250 ms. Hence, the wait time T1 is set to 250 ms. Next, the photometric process is executed in the next step S306, and the distance measuring process is executed in step S307.

Thereafter, the result of the photometric process executed in step S306 is AE-calculated in step S308. In step S310, the focus lens 14 is moved to a predetermined moving position in accordance with the distance measurement value set in step S307. When determining that the vibration quantity is smaller than the predetermined value in step S311, the vibration indicator is lit up, whereas if a determination of being larger than the predetermined value is given, the vibration indicator is flickered at 2 Hz.

Confirmed in step S314 is whether or not the release switch 20 is turned ON. If turned OFF, the operation proceeds to step S315 to confirm whether or not the half-stroke depression switch 19 is turned ON. When confirming that the half-stroke depression switch 19 is turned ON in step S315, the operation returns to step S314, wherein the ON/OFF state of the release switch 20 is confirmed. Further, when confirming that the half-stroke switch 19 is turned OFF in step S315, the consecutive photographing process comes to an end in step S316, and the operation goes back to the main flow in FIG. 2.

When determining that the release switch 20 is turned ON in step S314, the operation proceeds to step S317. In step S317, the center of the vibration reducing lens 13 is shifted from the initial reset position to the central position of the optical axis. The vibration reduction is started in step S318, and the wait time T3 (the pre-stabilizing control time for stabilizing the control of the vibration reduction, which may be 20 ms in the first embodiment) is waited in step S320, and thereafter the operation proceeds to step S320.

In step S320, the shutter starts opening. The vibration reducing process continues from step S318 before the shutter starts opening up to step S322 immediately after the shutter has completely closed. In step S320, the shutter is opened for the predetermined second with the EV value according to an AE arithmetic value obtained in step S308. Thereafter, the shutter closing process is executed in step S321, and the vibration reducing process is stopped in step S322. Then, the vibration reducing lens 13 is moved back to the initial position in step S323, and the focus lens 14 is moved to the predetermined reset position in step S324.

Subsequently, the film is wound up in step S325, and whether or not the release switch 20 is turned ON is confirmed in step S326. When the release switch 20 is turned ON, the operation returns to step S304 (FIG. 6), and the above processes are repeated. In the case of determining that the release switch 20 is turned OFF in step S326, after awaiting that the half-stroke depression switch 19 is turned OFF (step S327), the operation proceeds to step S328, wherein the vibration detecting circuits 3 and 4 are stopped. Then, the operation returns to the main flow from step S329. If the half-stroke depression switch 19 is turned ON (step S327), the operation goes back to step S304 (FIG. 6), and the above processes are repeated.

Figure 8:
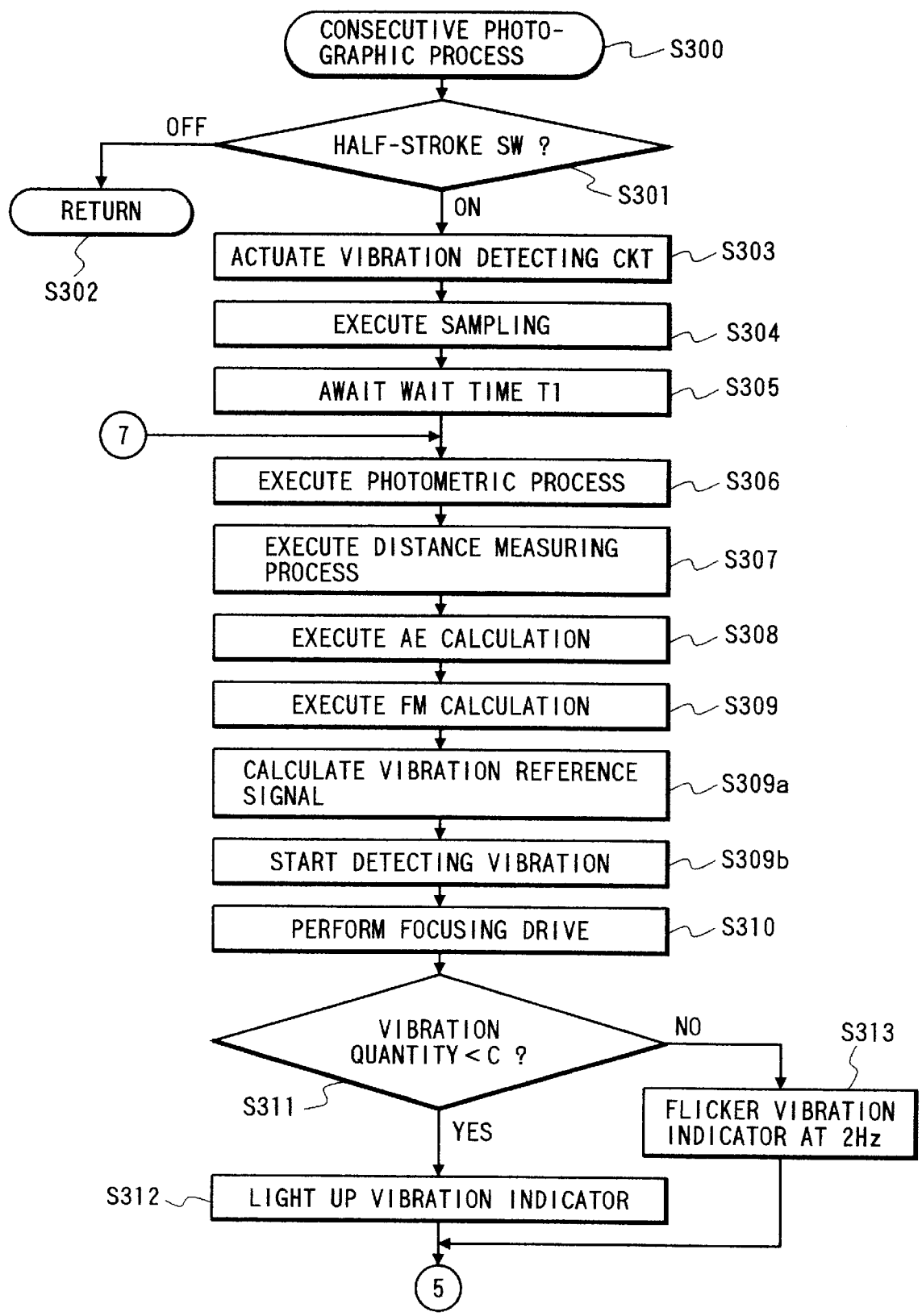
FIGS. 8, 9 and 10 are flowcharts showing the consecutive photographic process applied to the camera with vibration reducing function in a second embodiment of the present invention.
Figure 9:
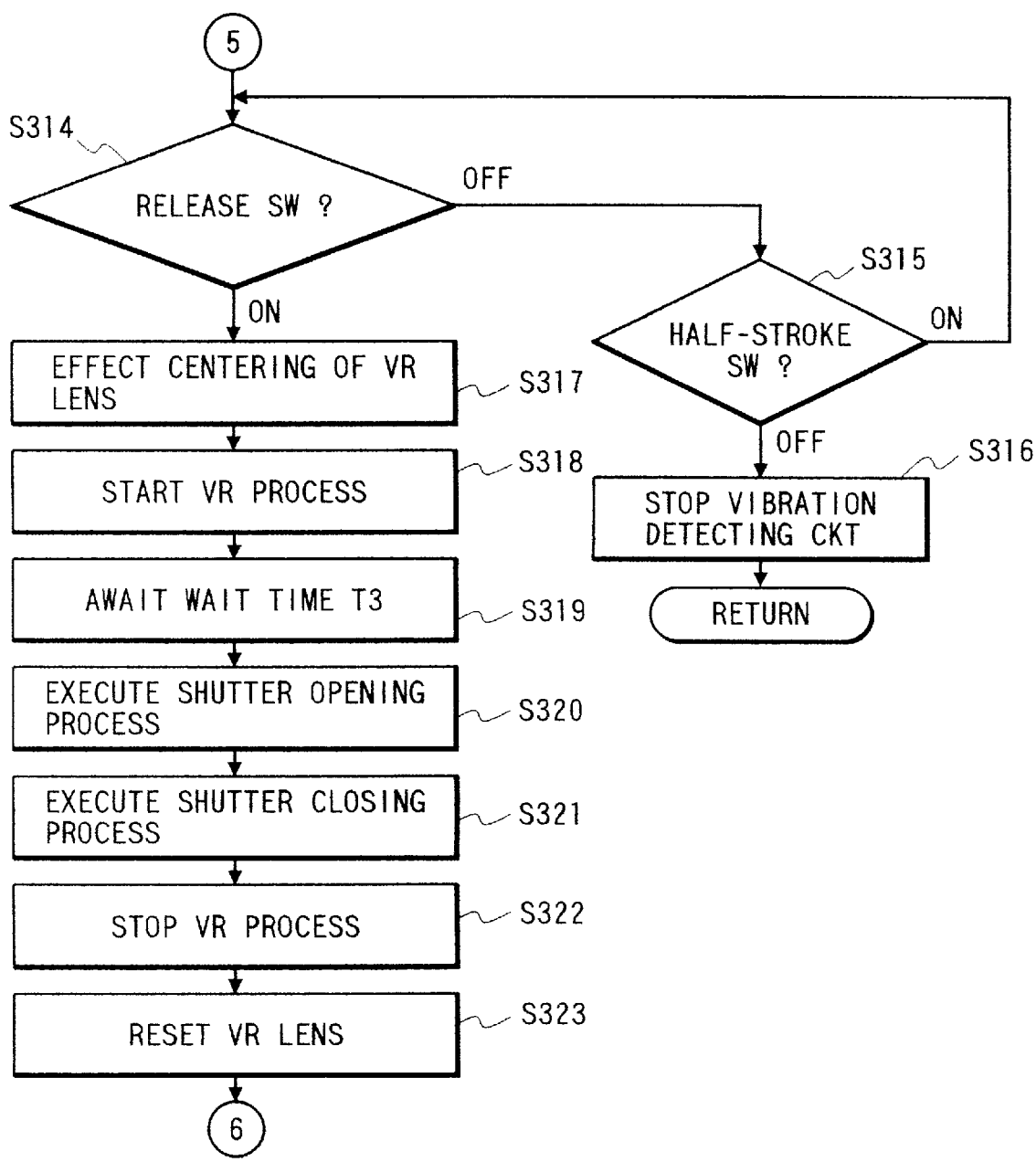
Figure 10:
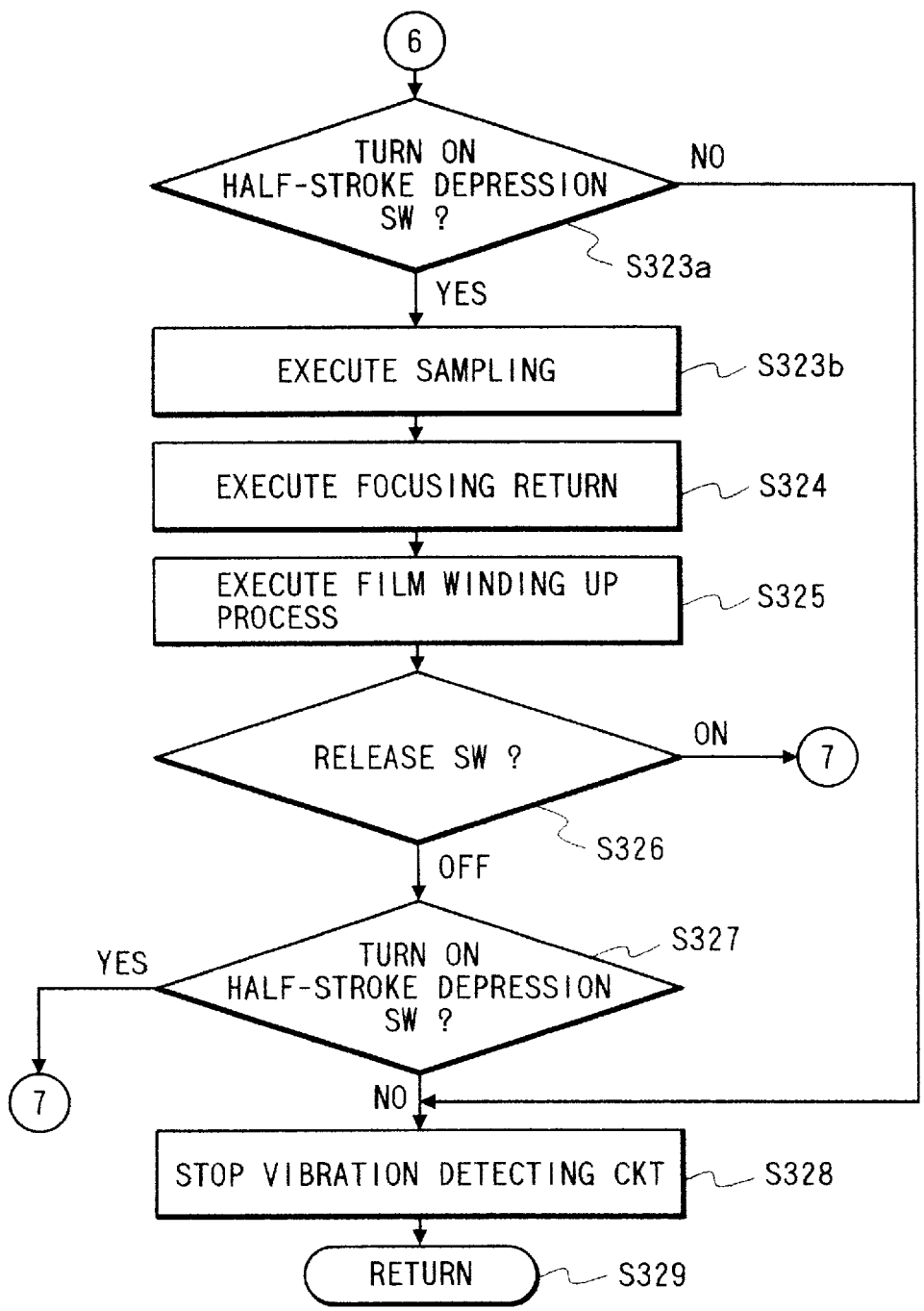

FIGS. 8, 9 and 10 are flowcharts showing the consecutive process (step S104 in FIG. 2) in a second embodiment. Program steps corresponding to the program steps of the above-mentioned consecutive photographing process in the first embodiment are marked with the same reference numerals, and their explanations are omitted. Given hereinafter is an explanation of only differences of the consecutive process in the second embodiment from the consecutive process in the first embodiment.

According to the consecutive photographing process in the second embodiment, unlike the above-described consecutive photographing process in the first embodiment, after executing the FM arithmetic process in step S309, the operation proceeds to step S309a, wherein the vibration reference signal is calculated. The calculation of this vibration reference signal is the same as the calculation thereof in step S208a (FIG. 3) with respect to the above normal photographic process, and hence its explanation is omitted. Then, after calculating the vibration reference signal, the vibration detection is started in step S309b, and the operation proceeds to step S310.

Further, according to the consecutive photographing process in the second embodiment, unlike the above-mentioned consecutive photographic process in the first embodiment, after resetting the vibration reducing lens in step S323, the operation proceeds to step S323a, wherein whether or not the half-stroke depression switch 19 is turned ON is confirmed. When confirming that the half-stroke switch 19 is turned ON in step S323a, the operation proceeds to step S323b, wherein sampling for calculating the vibration reference value is executed. This sampling is the same as that in step S304, and therefore its explanation is omitted. Then, after executing the sampling, the operation proceeds to a focusing return in step S324 and then to a film winding process in step S325. That is, according to the consecutive photographing process in the second embodiment, the sampling for calculating the vibration reference value is carried out during the focus lens return and the film winding process after the exposure has been done. Note that when confirming that the half-stroke depression switch 19 is not turned ON in step S323a, the operation proceeds to step S327 to stop the vibration detecting circuits 3 and 4. Then, the operation returns to the main flow from step S328.

Further, according to the consecutive photographing process in the second embodiment, unlike the consecutive photographing process in the first embodiment, when confirming that the release switch 20 is turned ON in step S326, or that the half-stroke depression switch 19 is turned ON in step S326a, the operation proceeds to step S306.

Figure 11:
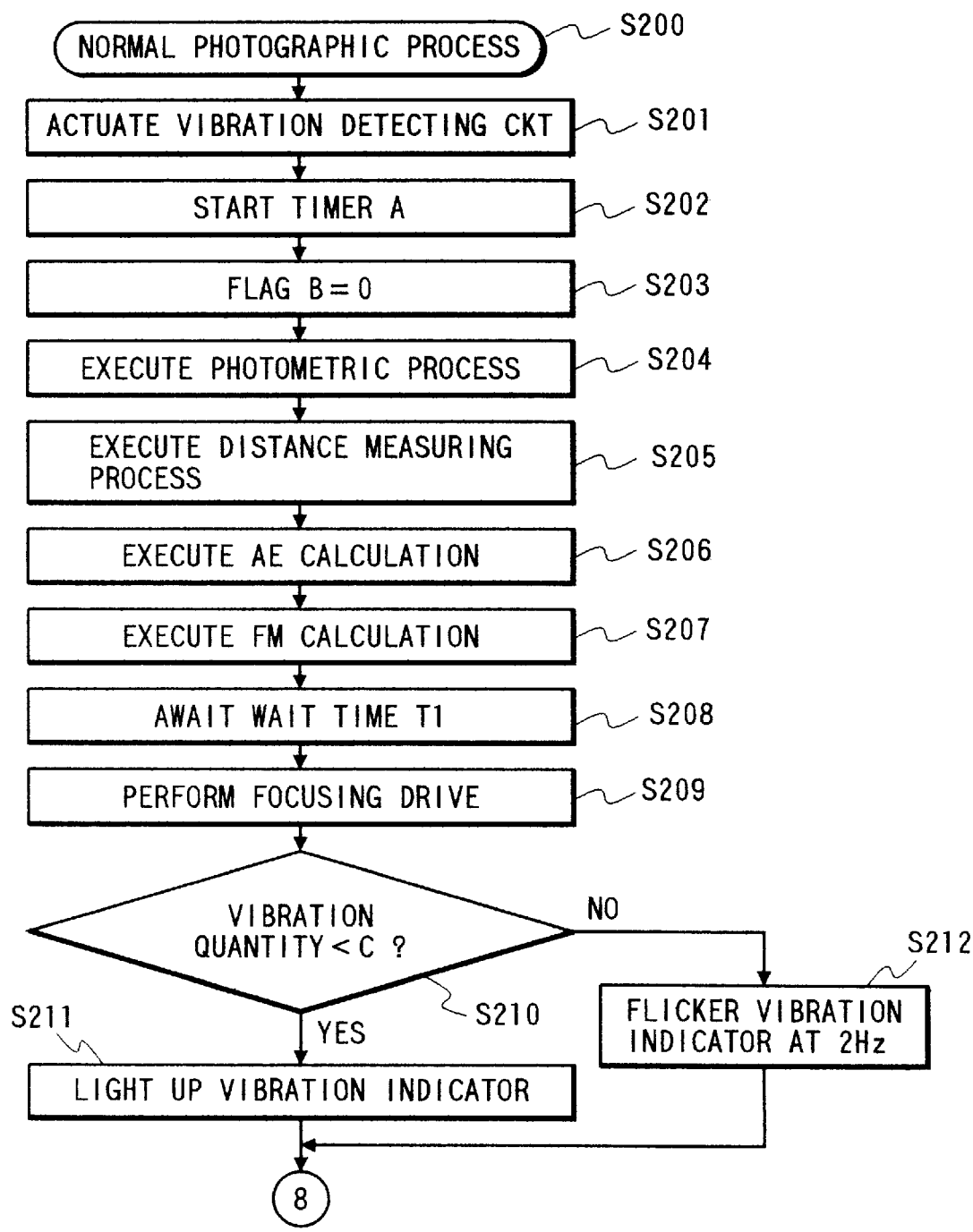
FIGS. 11 through 13 are flowcharts showing the normal photographic process applied to the camera with vibration reducing function in the second embodiment of the present invention.
Figure 12:
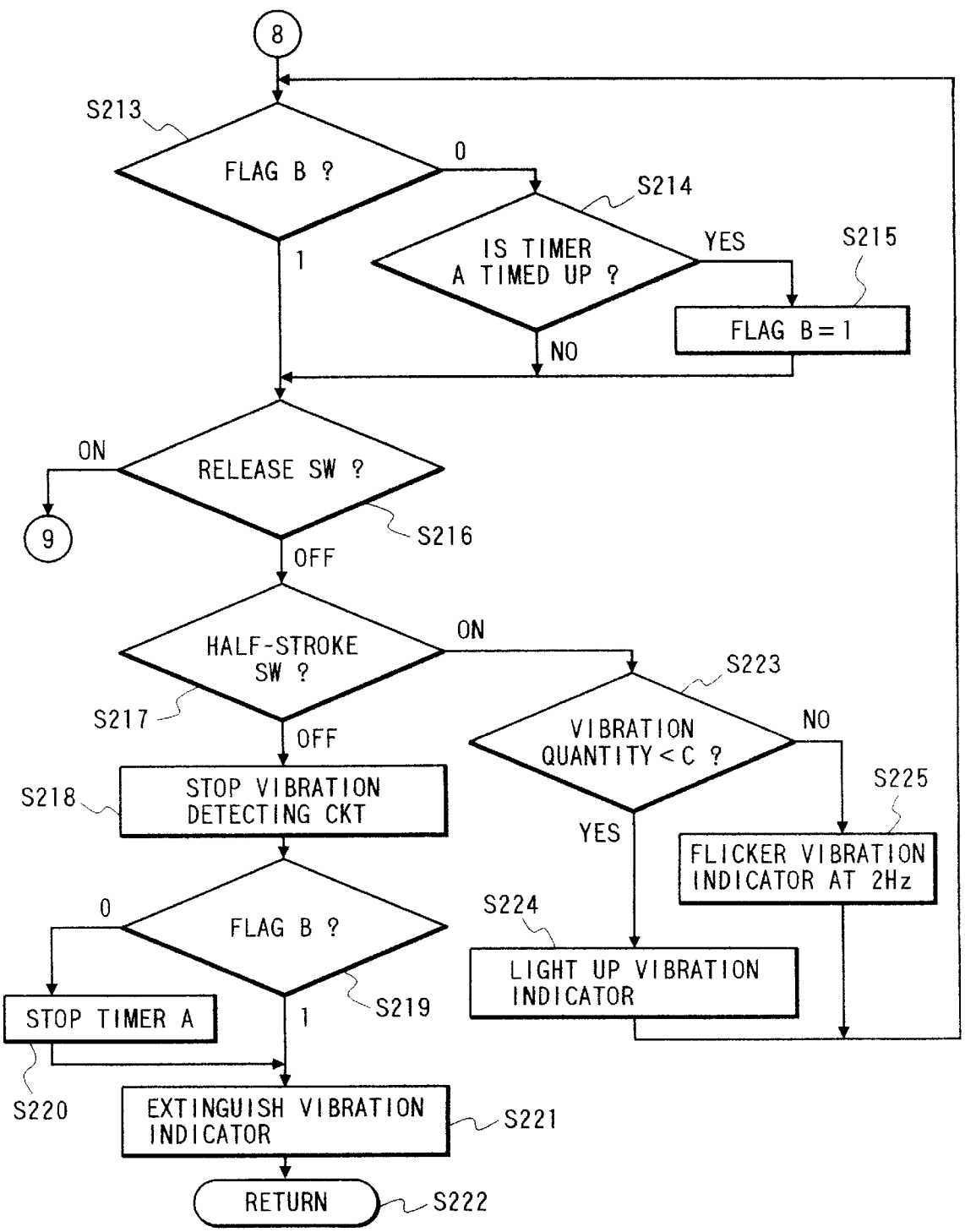
Figure 13:
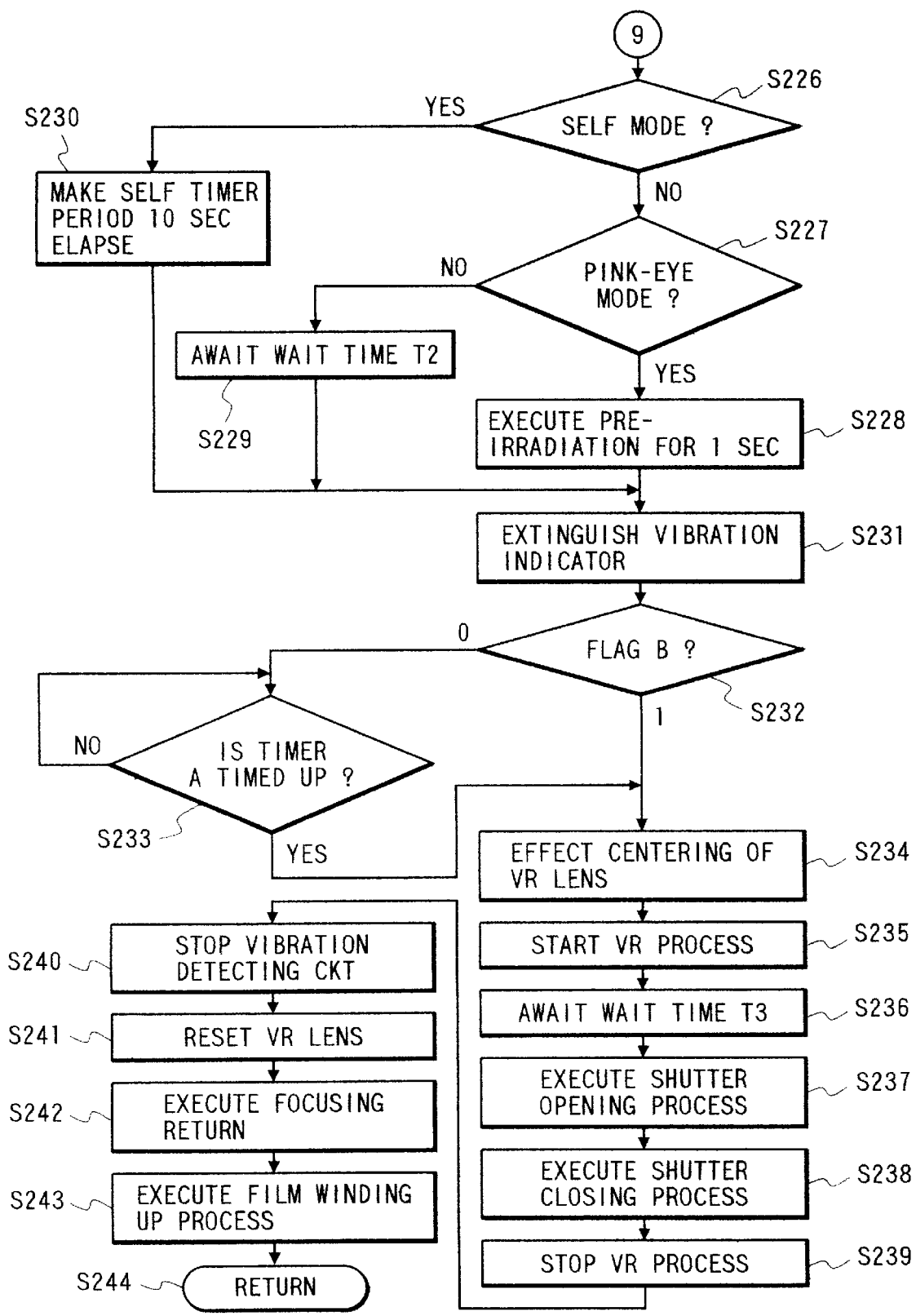

FIGS. 11 to 13 are flowcharts of the normal photographing process (Step S106 in FIG. 2) in the second embodiment.

The normal photographing process in the second embodiment is substantially the same as the above-described normal photographing process shown in FIGS. 3 to 5 in the first embodiment except for an omission of step S208a of calculating the vibration reference signal. Hence, program steps corresponding to the program steps of the normal photographing process are the same reference numerals used for the normal photographing process in the first embodiment, and the explanation thereof is omitted.

Figure 14:
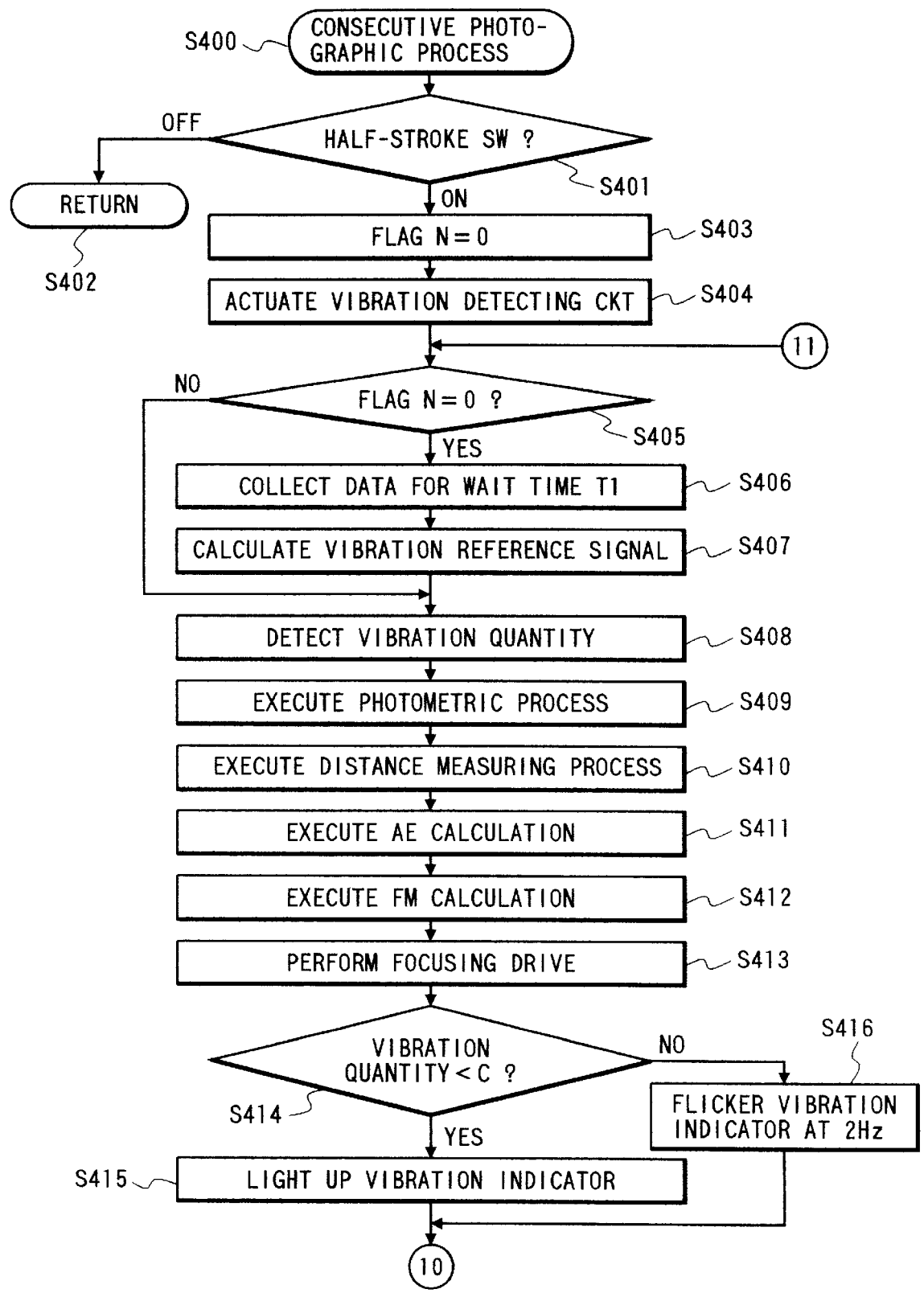
FIGS. 14 and 15 are flowcharts showing the consecutive photographic process applied to the camera with vibration reducing function in a third embodiment of the present invention.
Figure 15:
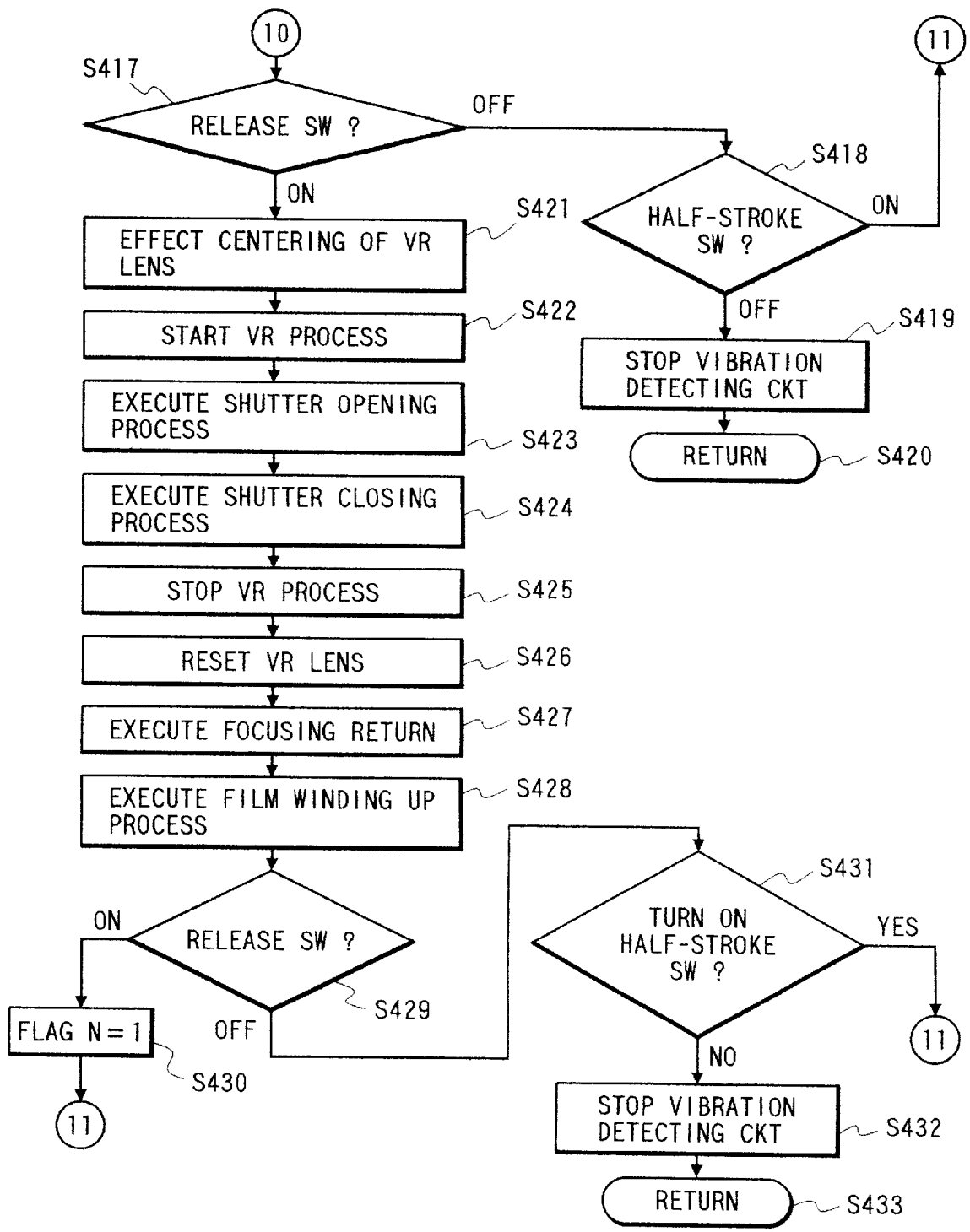

FIGS. 14 and 15 are flowcharts showing the consecutive photographing process (step S104 in FIG. 2) in a third embodiment. When determining that the consecutive photographing mode is selected in step S103 in the main flow shown in FIG. 2, the operation proceeds to this consecutive photographing process.

When confirming the half-stroke depression switch 19 in step S401, and if the half-stroke depression switch 19 is turned OFF, the operation proceeds to step S402 and then returns to the main flow.

When determining that the half-stroke depression switch 19 is turned ON in step S401, a flag N is set to 0 in step S403.

In the next step S404, the vibration detecting circuits 3 and 4 are actuated, and whether the flag N is 0 or not is checked in the next step S405. When the flag N is 0, an elapse of the wait time T1 is awaited in step S406. The wait time T1 is required for securing the circuit stabilizing time of the vibrations detecting circuits 3 and 4. In accordance with the third embodiment, the time obtained by subtracting the distance measuring time of 0 to 300 ms and the photometric time of 50 ms from the circuit stabilizing time of 300 ms, is 0 to 250 ms, and hence the wait time T1 is set to 250 ms.

Thereafter, in step S407, the vibration reference value is calculated. Generally, the output signals of the vibration detecting circuits 3 and 4 contain the drift quantity, and therefore the vibration reference signal is calculated in step S407 to obtain the precise angular speed by removing that drift quantity. The vibration reference signal can be calculated by averaging the output signal of the vibration detecting circuit 3 or 4 within a time shorter than the period of the drift component contained in the output signal of the vibration detecting circuit 3 or 4. After executing step S407, the vibration detecting circuit 3 or 4 detects the vibration quantity (step S408).

Next, the photometric process is executed in the next step S409, and the distance measuring process is executed in step S410. Thereafter, the result of the photometric process executed in step S409 is AE-calculated in step S411. In step S410, the focus lens 14 is moved to a predetermined moving position in accordance with the distance measurement value set in step S410, and the operation proceeds to step S414. Whether or not the vibration quantity is smaller than the predetermined value C, is checked in step S414. When determining that the vibration value is smaller than the predetermined value C, the indication on the vibration indicator is lit up, and the operation proceeds to step S417. When determining that the vibration quantity is larger than the predetermined value C, the vibration indicator is flickered at 2 Hz in step S416.

Confirmed in step S417 is whether or not the release switch 20 is turned ON. If turned OFF, the operation proceeds to step S418 to confirm whether or not the half-stroke depression switch 19 is turned ON. When confirming that the half-stroke depression switch 19 is turned ON in step S418, the operation returns to step S405, wherein the ON/OFF state of the release switch 20 is confirmed. Further, when confirming that the half-stroke switch 19 is turned OFF in step S418, after stopping the vibration detecting circuits 3 and 4 (step S419), the consecutive photographing process comes to an end in step S420.

When determining that the release switch 20 is turned ON in step S417, the operation proceeds to step S421. In step S421, the center of the vibration reducing lens 13 is shifted from the initial reset position to the central position of the optical axis. The vibration reduction is started in step S422, and thereafter the operation proceeds to step S423.

In step S423, the shutter starts opening. The vibration reducing process continues from step S422 before the shutter starts opening up to step S425 immediately after the shutter has completely closed. In step S423, the shutter is opened for the predetermined second with the EV value according to the AE arithmetic value obtained in step S411. Thereafter, the shutter closing process is executed in step S424, and the vibration reducing process is stopped in step S425. Then, the vibration reducing lens 13 is moved back to the initial position in step S426, and the focus lens 14 is moved to the predetermined reset position in step S427.

Subsequently, the film is wound up in step S428, and whether the release switch 20 is turned ON is confirmed in step S429. When the release switch 20 is turned ON, after the flag N has been set to 0 (step S430), the operation returns to step S405 (FIG. 13), and the photography resumes. In the case of determining that the release switch 20 is turned OFF in step S429, and when the half-stroke depression switch 19 is turned OFF (step S431), the operation proceeds to step S432, wherein the vibration detecting circuits 3 and 4 are stopped. Then, the operation returns to the main flow (FIG. 2) from step S433. When the half-stroke depression switch 19 is turned ON, the operation returns to step S405.

Having described preferred embodiments of the present invention, it is to be understood that many variations will occur to those skilled in the art within the scope of the appended claims.

What is claimed is:

1. A camera with vibration reducing function, comprising:
   a vibration detecting device to detect vibrations of said camera;
   a photography directing unit to direct said camera to perform photometric/distance measuring operations by a turn-ON process and to stop the photometric/distance measuring operations by a turn-OFF process;

a mode setting unit to direct said camera to set a specified mode, which is one of a consecutive photography mode and a normal photography mode, wherein consecutive photography occurs in said consecutive photography mode; and a control device to control said vibration detecting device in accordance with the directions given from said photography directing unit and said mode setting unit, wherein said control device makes said vibration detecting device continue the vibration detecting operation for such a duration that said mode setting unit sets the specified mode and that said photography directing unit is operated in the ON-state.

2. A camera with vibration reducing function according to claim 1, further comprising:

a vibration reference value calculating unit to calculate a reference value of vibration of said camera; and a vibration reducing device to reduce the vibration based on an output of said vibration detecting device, wherein when said mode setting unit sets the specified mode, said control device, after said vibration reference value calculating unit has calculated a vibration reference signal, starts control of said vibration reducing device.

3. A camera with vibration reducing function, comprising:

a vibration detecting device to detect vibrations of a camera;

a photography directing unit to direct said camera to perform photometric/distance measuring operations by a turn-ON process and to stop the photometric/distance measuring operations by a turn-OFF process;

a mode setting unit to direct said camera to set a specified mode, which is one of a consecutive photography mode and a normal photography mode, wherein consecutive photography occurs in said consecutive photography mode; and a control device to control said vibration detecting device in accordance with the directions given from said photography directing unit and said mode setting unit, wherein said control device calculates a vibration reference signal each time the photography is conducted for such a duration that said mode setting unit sets the specified mode and that said photography directing unit is operated in the ON-state.

4. A camera with vibration reducing function according to claim 3, wherein data sampling for calculating the vibration reference signal is started after an exposure has been performed but before starting a feed of film.

5. A camera with vibration reducing function, comprising:

a vibration reference value calculating unit to calculate a reference value of vibration of said camera;

a vibration detecting device to detect vibration based on the reference value;

a consecutive photographing mode selecting unit to direct said camera to select a consecutive photographing mode or a non-consecutive photographing mode; and a control device to control said vibration detecting device in accordance with a direction given from said consecutive photographing mode selecting unit, wherein said control device, when the consecutive photographing mode is selected, operates said vibration reference value calculating unit up to a specified number of photographic frames in a series of photographing operations but inhibits the operation after the specified number of photographic frame.

6. A camera with vibration reducing function according to claim 5, wherein the specified number of photographic frames in the series of photographing operations is 1.

7. A camera having a vibration reducing function, comprising:

a vibration detecting device to detect vibrations of a camera;

a mode selecting unit to select a specified mode of the camera, the specified mode being one of a normal photography mode and a consecutive photography mode; and a control device to control said vibration detecting device in accordance with directions from said mode selecting unit, wherein said control device calculates a vibration reference signal each time a photography is conducted for a specified duration.

* * * * *

UNITED STATES PATENT AND TRADEMARK OFFICE
CERTIFICATE OF CORRECTION

PATENT NO. : 5,835,796
DATED : November 10, 1998
INVENTOR(S) : Hidenori Miyamoto, et al.

It is certified that error appears in the above-identified patent and that said Letters Patent is hereby corrected as shown below:

Title Page, [30] Foreign Application Priority Data, ADD
--8-265440 JAPAN 09/13/96--.

Signed and Sealed this

Twenty-first Day of December, 1999

Attest:

Q. TODD DICKINSON

*Attesting Officer*   *Acting Commissioner of Patents and Trademarks*